No. 885,215. PATENTED APR. 21, 1908.
W. M. AMER.
AUTOMATIC ADJUSTER FOR FAN BOXES OF COMBINED HARVESTERS.
APPLICATION FILED APR. 15, 1907.
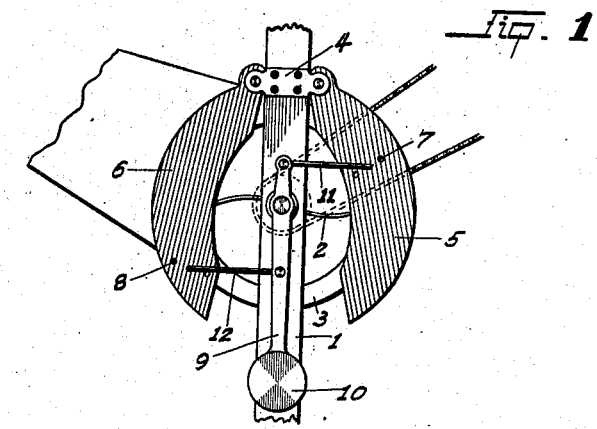
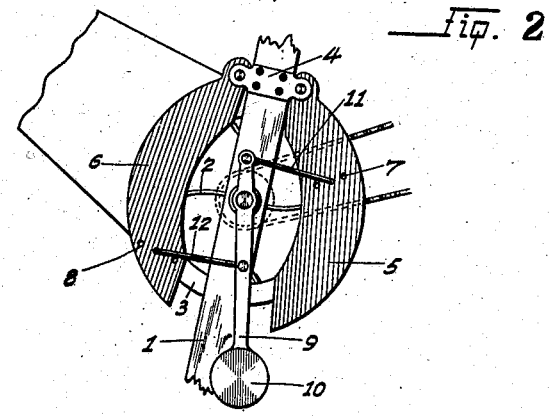
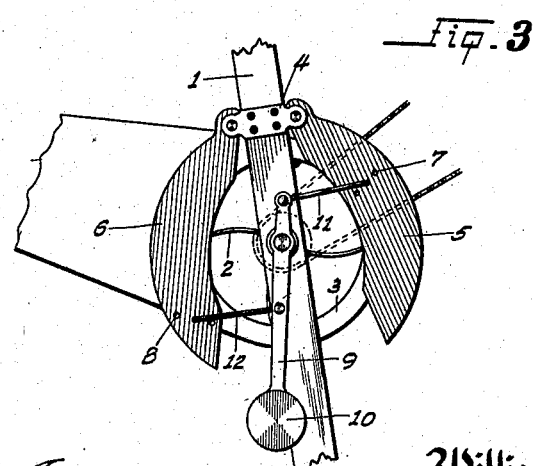

UNITED STATES PATENT OFFICE.

WILLIAM M. AMER, OF MADERA, CALIFORNIA.

AUTOMATIC ADJUSTER FOR FAN-BOXES OF COMBINED HARVESTERS.

No. 885,215.  Specification of Letters Patent.  Patented April 21, 1908.

Application filed April 15, 1907. Serial No. 368,203.

*To all whom it may concern:*

Be it known that I, WILLIAM M. AMER, a citizen of the United States, residing at Madera, in the county of Madera and State of California, have invented certain new and useful Improvements in Automatic Adjusters for Fan-Boxes of Combined Harvesters; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in combined harvesters and particularly to the wind fans thereof, my object being to produce an automatic device for regulating the quantity of air drawn into the fan according to the need thereof, for instance in traveling on a down grade the machine would naturally run faster, thus threshing more grain, thereby requiring more wind, and vice versa for upgrade travel.

I accomplish the objects of my invention by means of two pivoted end doors on the fan box and a pivoted weight linked to said doors operating to automatically control the same; also by such other and further construction as will appear by a perusal of the following specification and claims.

In the drawings similar characters of reference indicate corresponding parts in the several views.

Figure 1 is an end elevation of a fan box showing my device as it appears when the machine is in its normal or level position. Fig. 2 is a similar view of the device as it appears when the machine is traveling on an upgrade. Fig. 3 shows the position of the device when the machine is traveling on a down grade.

Referring more particularly to the reference numerals on the drawing 1 represents one of the upright beams of the machine in which is journaled the fan 2 incased in its box 3. Pivotally mounted on hangers 4 on said beam 1 are end doors, each end door being divided into two members 5 and 6, 5 in the arrangement herein shown being the right hand member and 6 the left hand member, said members 5 having a series of holes 7 near the top thereof and the members 6 having a similar series of holes 8 near the bottom thereof for the purpose as will appear.

Swinging on the beam 1 is a lever 9 having a weight 10 at its lower end. From the upper end of the lever 9 a link 11 leads to and is inserted at its free end into one of the holes 7, and a similar link 12 extends from a point below the pivot of said lever and has its free end engaged in one of the holes 8.

When the device is used the links 11 and 12 are inserted in such holes 7 and 8 as will make the opening between the pieces 5 and 6 a sufficient size to admit the amount of air required for level traveling. When in this position the beams 1 and levers 9 are perpendicularly parallel to each other.

When the machine strikes an upgrade the beams 1 naturally tilt backward (Fig. 2), but the levers 9 having the weights 10 remain perpendicular. This action causes the links 11 and 12 to pull the members 5 and 6 inward, thus lessening the space therebetween and incidentally decreasing the amount of air admitted. Vice versa when the machine strikes a down grade the beams 1 tilt forward, the lever 9 remains perpendicular, and thus the links 11 and 12 drive the members 5 and 6 outward, thus increasing the space between the members and permitting a greater volume of air drawn into the fan. Thus it will be seen that when the machine goes down grade and necessarily faster and threshes a larger quantity of grain and more air is required to remove the chaff etc., the same is automatically supplied by my device, and when the machine goes slowly up grade and consequently threshes less grain, requiring less air, the same is automatically reduced by my device. The value and advantages of this will be readily understood by one acquainted with the use of combined harvesters.

While I have described my device as it is used in connection with combined harvesters, still it may be used on many other traveling devices having an air blast supply.

While this specification sets forth in detail the present and preferred construction of my device, still in practice many small deviations therefrom may be resorted to at will without departing from the spirit of the invention.

Having thus described my invention, what I claim as new and useful and desire to secure by Letters Patent is:—

1. In a device of the kind described a fan box, end doors therefor consisting of two pivoted members, holes disposed in the right hand members near the tops thereof, and the left hand members near the bottoms thereof, levers pivotally mounted on each end of said fan box, weights at the lower ends of said levers, links connecting the upper end of each of said levers with one of said right hand holes, and similar links connecting the lower end of each of said levers with one of said left hand holes, as set forth.

2. In a device of the character described, a supporting beam, a fan journaled therein, a fan box inclosing said fan, a hanger secured to the beam, a pair of doors pivotally suspended from said hanger, a weighted lever pivotally suspended from the beam, and connections between said lever and the doors at opposite sides of the pivotal point of the lever whereby the space between the doors is varied according to the position of the weighted lever.

3. In a device of the kind described, a fan, a fan box, a supporting beam therefor, a pair of doors pivotally supported at their upper ends and suspended from said beam, a weighted lever pivotally supported from the beam, and adjustable connections between the weighted lever and the doors, the connections between one door and the lever being on one side of the pivotal point of said lever and the connection between the other door and said lever being on the opposite side of the pivotal point of said lever whereby the space between the doors is varied according to the position of said weighted lever.

In testimony whereof I affix my signature in presence of two witnesses.

WILLIAM M. AMER.

Witnesses:
  W. H. LAREW,
  Mrs. L. B. SILVEY.